(12) United States Patent
Byrd et al.

(10) Patent No.: US 7,536,297 B2
(45) Date of Patent: May 19, 2009

(54) SYSTEM AND METHOD FOR HYBRID TEXT MINING FOR FINDING ABBREVIATIONS AND THEIR DEFINITIONS

(75) Inventors: Roy J. Byrd, Ossining, NY (US); Youngja Park, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 1086 days.

(21) Appl. No.: 10/055,279

(22) Filed: Jan. 22, 2002

(65) Prior Publication Data

US 2003/0139921 A1 Jul. 24, 2003

(51) Int. Cl.
G06F 17/21 (2006.01)
(52) U.S. Cl. .............................. 704/10; 704/9; 704/251
(58) Field of Classification Search ................ 704/260, 704/1–10, 251–257; 707/512, 6, 203, 102; 715/512, 540
See application file for complete search history.

(56) References Cited

U.S. PATENT DOCUMENTS

| | | | | |
|---|---|---|---|---|
| 5,634,084 | A | * | 5/1997 | Malsheen et al. ........... 704/260 |
| 5,809,500 | A | * | 9/1998 | Nolan ............................ 707/6 |
| 6,279,018 | B1 | * | 8/2001 | Kudrolli et al. ............. 715/540 |
| 6,385,629 | B1 | * | 5/2002 | Sundaresan et al. ......... 715/512 |
| 6,532,481 | B1 | * | 3/2003 | Fassett, Jr. ................... 707/203 |

OTHER PUBLICATIONS

Acronyms & Abbreviations p. 1, Oct. 24, 2001, http://www.acronymfinder.com.
Telecom Acronym Reference p. 1, Oct. 24, 2001, http://www.tiaonline.org/resources/acronym.cfm.
Hanford acronym and Abbreviation Directory p. 1, Oct. 24, 2001, http://www.hanford.gov/acronym/.
The WorldWideWeb Acronym and Abbreviation Server p. 1, Oct. 24, 2001, http://www.ucc.ie/info/net.acronyms/acro.html.
Mining the Web for Relations pp. 1-24, Oct. 24, 2001, by Neel Sundaresan, Jeonghee Yi. http://www9.org/w9cdrom/363/363.html.
Acrophile: An Automated Acronym Extractor and Server, pp. 209-214, by Leah S. Larkey, Paul Ogilvie, M. Andrew Price, Department of Computer Science, University of Massachusetts, Anhurst, MA, Brenden Tamilio, School of Cognitive Science, Hampshire College, Amherst, MA, published in 2000.
Automatic Extraction of Acronyms from Text, pp. 1-8, by Stuart Yeates, Computer Science, Waikato University, Private Bag 3105, Hamilton, New Zealand, published in 1999.
Recognizing Acronyms and Their Definitions pp. 1-18, by Kazem Taghva and Jeff Gilbreth, Technical Report 95-03, Information Science Research Institute, University of Nevada, Las Vegas, Jun. 1991.

* cited by examiner

*Primary Examiner*—Huyen X. Vo
(74) *Attorney, Agent, or Firm*—Ann Dougherty; Hoffman Warnick LLC

(57) ABSTRACT

This present invention matches one or more abbreviations to one or more definitions. The invention has an abbreviation pattern generation process that generates one or more abbreviation patterns corresponding to the candidate abbreviations, and a definition pattern generation process that generates one or more definition patterns corresponding to the candidate definitions.

22 Claims, 11 Drawing Sheets

| Abbreviation Pattern | Definition Pattern | Formation Rule |
|---|---|---|
| cc | wph | (1,F) (2,F) |
| cc | wsw | (1,F) (3,F) |
| cc | ww | (1,F) (2,F) |
| ccc | phww | (1,F) (3,F) (4,F) |
| ccc | wphw | (1,F) (2,F) (4,F) |
| ccc | wsw | (1,F) (2,F) (3,F) |
| ccc | wsww | (1,F) (3,F) (4,F) |
| ccc | wwsw | (1,F) (2,F) (4,F) |
| ccc | www | (1,F) (2,F) (3,F) |
| ccc | www | (1,R) (2,F) (3,R) |
| cccc | phwsww | (1,F) (3,F) (5,F) (6,F) |
| cccc | wphww | (1,F) (2,F) (4,F) (5,F) |
| cccc | wsww | (1,F) (2,F) (3,F) (4,F) |
| cccc | www | (1,F) (2,F) (3,R) (3,I) |
| ccn | wwn | (1,F) (2,F) (3,E) |
| cnc | wsw | (1,F) (2,R) (3,F) |
| ncc | www | (1,R) (2,F) (3,F) |

FIG. 6

| | |
|---|---|
| 1-PP | [ 1 – pyrimidinylpiperazine] |
| 2-MASS | [Two-Micron All Sky Survey] |
| BPP | [biophysical profiling] |
| Caltech | [California Institute of Technology] |
| CFCs | [chlorofluorocarbons] |
| COMPASS | [Commodity Procurement and Analysis Support Systems] |
| CONTOUR | [Comet Nucleus Tour] |
| D2T2 | [Dye Diffusion Thermal Transfer] |
| EarthSat | [Earth Satellite Corporation] |
| F&M | [Facilities and Materials] |
| frntfndr | [front fender] |
| Glyb | [Glyburide] |
| HDL-C | [HDL-cholesterol] |
| HDLs | [High density lipoproteins] |
| IMAGE | [Imager for Magnetopause-to-Aurora Global Exploration] |
| mpc | [megaparsec] |
| PDB | [Product Database] |
| R1H | [radial first harmonic] |
| scramjet | [supersonic combustible ramjet] |
| SeaWiFS | [Sea-viewing Wide Field-of-view Sensor] |
| SMEX | [Small Explorers] |
| T/C/F | [Trim/Chassis/Final] |
| TERRIERS | [Tomographic Experiment using Radiative Recombinative Ionospheric Extreme ultraviolet and Radio Sources] |
| USDA | [U.S. Department of Agriculture] |
| W3C | [World Wide Web Consortium] |
| WBD | [Wideband] |

FIG. 11

SYSTEM AND METHOD FOR HYBRID TEXT MINING FOR FINDING ABBREVIATIONS AND THEIR DEFINITIONS

FIELD OF THE INVENTION

This invention relates to document processing and text analysis. More specifically, the invention relates to finding abbreviations and their definitions in texts.

BACKGROUND OF THE INVENTION

To extract valuable information automatically from electronic documents, we need systems to understand the information those documents contain. In particular, a huge number of abbreviations are used in electronic documents, especially technical documents, with or without their corresponding definitions. As the number of electronic documents increases, the use of abbreviations increases too and the methods for generating abbreviations are increasing. Thus, the ability to find correct abbreviations and their definitions is very important for natural language understanding systems such as information retrieval, glossary extraction and speech recognition.

For example, if a person searches documents about the "World Wide Web" on the Internet, search engines will only retrieve documents containing the exact string "World Wide Web". However, if the systems have the capability of recognizing abbreviations and finding their definitions, those systems could return documents containing "WWW" and "W3" as well.

Many acronym dictionaries have been complied by hand and published in books and on the web. Some examples are found at AcronymFinder (http://www.acronymfinder.com), The World Wide Web Acronym and Abbreviation Server (http://www.ucc.ie/info/net/acronyms/acro.html), Hanford Acronym and Abbreviation Directory (http://www.hanford.gov/acronym) and Telecom Acronym Reference (http://www.tiaonline.org/resources/acronym.cfm).

Acronym and definition lists published in dictionaries appear to have high accuracy because they were deliberately collected and compiled by experts. However, it is very difficult and time-demanding work to keep the dictionaries up-to-date. The accuracy of web-based lists varies widely. The problem with many web-based acronym lists is that they allow people submit new acronyms and their definitions freely. If the list administrators don't examine those candidates very carefully or if they don't know about the domains very well, incorrect pairs of acronyms and definitions could be added.

There has been some work on automatically recognizing acronyms and their definitions in texts. AFP (Acronym Finding Program) and TLA (Three Letter Acronym) are early attempts to automatically find acronyms and their definitions in free format texts. See Taghva, Kazem and Jeff Gilbreth. Recognizing Acronyms and their Definitions, *Technical Report* 95-03, *Information Science Research Institute, University of Nevada, Las Vegas,* June 1995 and Yeates, Stuart. Automatic Extraction of Acronyms from text. In *Proceedings of the Third New Zealand Computer Science Research Students' Conference.* Pp 117-124, 1999.

AFP was developed as a post-processing system for the improvement of text output from optical character recognition devices. It considers an upper-cased word from 3 to 10 characters in length as an acronym and tries to match the letters of the acronym and the first letters of a sequence of words to find a probable definition. TLA is very similar to AFP but it considers the first three letters in each word of a possible definition.

More advanced methods are found in Sundaresan and Yi's work and the Acrophile system at UMass Amherst. See Larkey, Leah, Paul Ogilvie, Andrew Price and Brenden Tamilio. "Acrophile: An Automated Acronym Extractor and Server", In *Proceedings of the ACM Digital Libraries conference,* pp. 205-214, 2000 and Sundaresan, Neel and Jeonghee Yi. Mining the Web for Relations, In *The Ninth International World Wide Web Conference,* 2000. http://www9.org/w9cdrom/363/363.html.

Sundaresan and Yi identify acronyms and the definitions in the documents on the web. They start with a base set of acronym-definition pairs, in which the definitions occur in structural relationship to the acronyms in web pages and then crawl the web to look for new acronym-definition pairs. In this system, they consider upper-case words as acronyms and match acronyms with the first character of words. The Acrophile system handles a wider range of acronym patterns than other work. It allows single interior "/" or "-", interior lower cases and one non-final digit in acronyms.

Acronym processors have been embedded in a couple of different applications such as U.S. Pat. Nos. 5,161,105 and 5,634,084. U.S. Pat. No. 5,161,105, inventors Kugimiya, et al., entitled "Machine translation apparatus having a process function for proper nouns with acronyms" has a device for determining if a word string in a sentence is a proper noun with an acronym and a device for examining if the number of first letters of each of a certain number of words corresponds to the number of letters of the acronym. If these words are registered in a dictionary, it outputs the corresponding terms after the words are translated. When the words are not registered in the dictionary, it outputs the words without translating them. U.S. Pat. No. 5,634,084, inventors Malsheen, et al., entitled "Abbreviation and acronym/initialism expansion procedures for a text to speech reader", has an acronym/initialism expanding procedure that identifies acronyms and initialisms in text message and parses pronounceable syllables within the identified words and generates a substitute string comprising a sequence of units, each unit selected from the set consisting of a letter, number, pronounceable syllable and multiple letter identifier.

PROBLEMS WITH THE PRIOR ART

Some research has been done to find acronyms and their definitions in documents. However, these systems are not enough to recognize the full variety of abbreviation-definition styles.

Previous work has the following four problems:

First, the existing abbreviation recognition methods deal with very restricted types of acronyms; they regard all upper-case words as acronyms. Acrophile allows internal lower-case letters and only 1 digit in any non-final position. They can't handle more general abbreviations, such as lower case abbreviations, contractions, multi-word abbreviations and special numeric abbreviations, which are very common in modem documents.

Second, these systems rely on certain textual patterns to recognize acronyms and the definitions. They expect the definitions found next to the acronyms and enclosed by parentheses. However, in many cases, acronyms are used in different sentences from their definitions without any strong cues.

Third, these systems consider the first letter of each word in the definition when matching with an acronym (TLA considers the first three letters in each word). However, the construction methods of abbreviations are more complicated as in ALT (agranulocytosis thrombocytopenia), WBD (wideband) and R1H (radial first harmonic).

Fourth, those systems are basically hard-coded, heuristics-based algorithms and they were designed based on examples that could be anticipated when the algorithms were devised. However, it is easy to find new types of abbreviations, which cannot be processed by these hard-coded systems. To process the new types of abbreviations, the systems need to be modified by hand, which requires a lot of time and effort.

OBJECTS OF THE INVENTION

An object of this invention is a system, method and program that applies pattern-based abbreviation rules for matching one or more abbreviations and one or more possible definitions.

A further object of this invention is a system, method and program that match one or more strings of characters (abbreviations) and one or more sequences of words (definitions) and generate new pattern-based abbreviation rules, which may be added to an existing rulebase for future use.

Another object of this invention is a system, method and program for identifying abbreviations and their definitions in a collection of electronic documents.

SUMMARY OF THE INVENTION

The present invention is a system and method for matching one or more abbreviations and one or more definitions. The invention has an abbreviation pattern generation process that generates one or more abbreviation patterns corresponding to the candidate abbreviations, and a definition pattern generation process that generates one or more definition patterns corresponding to the candidate definitions.

BRIEF DESCRIPTION OF THE FIGURES

The foregoing and other objects, aspects, and advantages will be better understood from the following non-limiting detailed description of preferred embodiments of the invention with reference to the drawings that include the following:

FIG. 6 lists sample abbreviation rules.

FIG. 11 shows sample output of the system.

DETAILED DESCRIPTION OF THE INVENTION

This invention is a system, method and program to find abbreviations and their definitions used in a document collection so that users and/or computer applications can recognize that an abbreviation and its definition refer to the same entity. An abbreviation is defined as a shortened form of a written word or phrase used in place of the full form. Acronyms are a special case of abbreviations which are devoted to multi-word full forms. Unlike typical acronym finding systems, this invention proposes pattern-based abbreviation rules and a rule generation process. This program can be integrated into many language processing systems such as a terminology extraction system, an information retrieval system and a speech recognition system.

Figure 1:
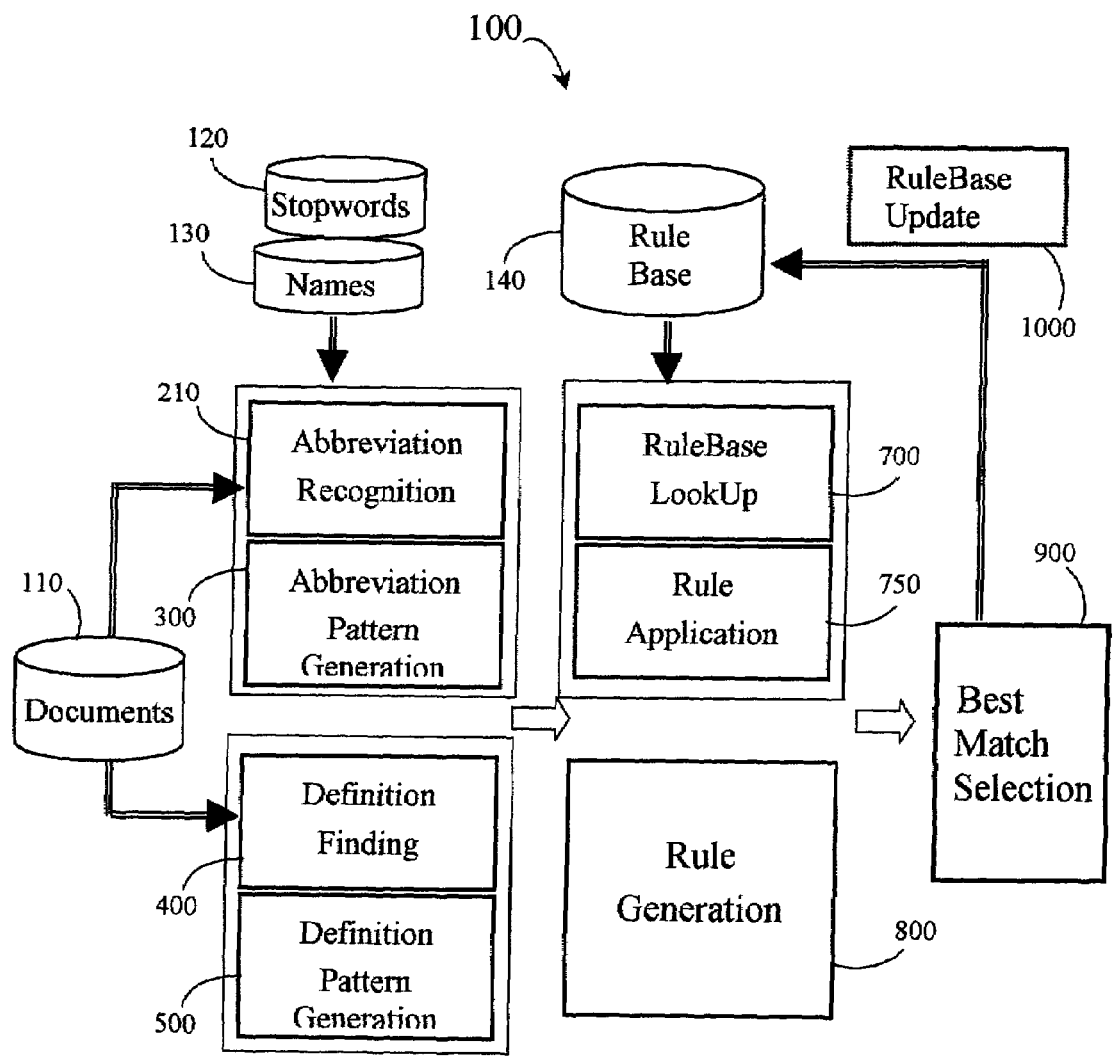
FIG. 1 is a block diagram one preferred system architecture of the present invention.

FIG. 1 shows the overall flow of the process performed by the present invention (100). In FIG. 1, rectangles with thicker solid lines represent processors in this system—abbreviation recognition (210), abbreviation pattern generation (300), definition finding (400), definition pattern generation (500), rulebase lookup (700), rule application (750), rule generation (800), best-match selection (900), and rulebase lookup (1000).

The abbreviation recognition process (210) seeks candidate abbreviations in a text and the abbreviation pattern generation process (300) produces patterns for the possible abbreviations. When an abbreviation candidate is found, the system determines the contexts within which to look for a definition (400). When it finds a candidate definition, it generates a pattern for it also (500).

Having generated the abbreviation pattern and the definition pattern, the system first searches the rulebase for a rule which would generate the abbreviation from the definition (700). The rules for the given candidates are applied in the order of rule priorities (750).

If the rulebase is empty or if no existing rule matches the candidate abbreviation with the candidate definition, the system runs the abbreviation matcher and generates a new abbreviation rule (800). The abbreviation matcher consists of 5 layered matching algorithms.

The invention may generate multiple possible definitions for an abbreviation from a document. Only one definition exists in a local context (for example, a sentence) of an abbreviation but more than one definitions may exist in a global context (for example, a document). The best match selection process (900) chooses the right definitions of an abbreviation from all the candidate definitions found.

The rules applied to match abbreviations and definitions or generated by the rule generation process (800) may be modified in or added to the rulebase respectively, allowing it to grow as the system processes new documents (1000).

Figure 2:
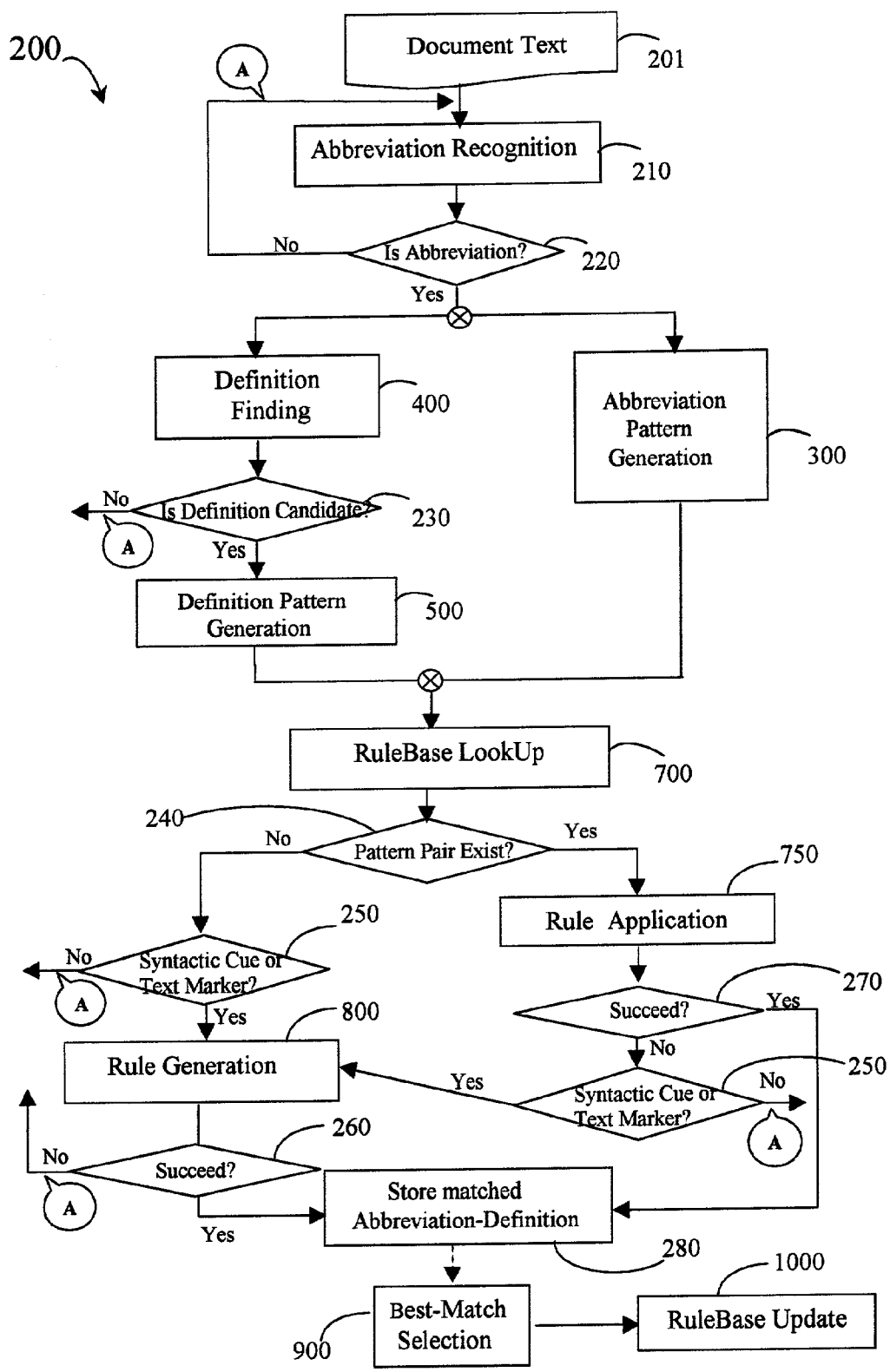
FIG. 2 is a flow chart of the overall system operation.

FIG. 2 shows a flow chart of the overall processes of the present invention. When a document (201) is read in the system, the abbreviation recognition process (210) examines each string of characters in the document and decides if the string may be an abbreviation. The invention considers a string of alphabetic, numeric and special characters as a candidate abbreviation if it satisfies the following three conditions:

Its first character is alphabetic or numeric

Its length is between 2 and 10 characters

It contains at least one capital letter if it does not have any cues in its local context and if the string meets the following restrictions:

It is not a known (dictionary) word containing an initial capital letter and appearing as the first word in a sentence.

It is not a member of a predefined set of person and location names.

It is not a member of user-defined list of stopwords.

The first restriction keeps many common words from being treated as possible abbreviations. Many proper names have the same characteristics above and may be recognized as abbreviations. To reduce generating false candidates and thus improve system performance, the invention uses a list of proper names if one is available. This invention provides users with a way to create a user defined list of stopwords. The stop word list, in the present invention, refers a list of words which users don't want to consider as abbreviations. Users may have different lists of stopwords according to domains.

If a string is not a possible abbreviation, the system ignores the string and reads the next string from the document (A). If a string satisfies the above conditions and restrictions (220), the system generates a pattern for the abbreviation (300). At the same time, the system calculates the size of the context and looks for candidate definitions in the context (400). If a candidate definition is found (230), the system generates a definition pattern (500). If no candidate is found, the system ignores the abbreviation and reads the next string (A).

The system looks up the rulebase with the abbreviation pattern and the definition pattern (700). If the pattern pair exists in the rulebase (240), the system applies the associated formation rules in priority order (750). If any rule can generate the given abbreviation from the definition, the pair is regarded as valid (270) and stored in a temporary storage (280). If no rule successfully generates the abbreviation from the definition (270), the system checks if the abbreviation and the definition occur in one of the cue environments (250) described below, the system activates the rule generation process (800).

If the pattern pair does not exist in the rule base (240) and the pair occurs in a cue environment (250), the rule generation process (800) tries to match the abbreviation and the definition. If the match is successful (260), the system stores the result (280). If the match fails (260), the system discards the pair, and read the next string from the document (A).

If there exist text markers and/or cue words in the contexts of a candidate abbreviation and its candidate definition, the pair is highly likely to be valid and to be useful for augmenting the abbreviation rulebase. The cue information this invention takes into account includes:

(1) (abbr) or [abbr]
(2) (definition) or [definition]
(3) abbr=definition
(4) definition=abbr
(5) abbr, or definition
(6) definition, or abbr
(7) abbr . . . stands/short/acronym . . . definition
(8) definition, abbr for short The system may find more than one definition candidates in the context determined by definition finding process (400). However, only one definition for an abbreviation exists in a local context and the best match selection process (900) chooses the best definition from all the candidates. At the end of processing for a document, an abbreviation may still have multiple definitions found in different contexts. The best match selection process (900) disambiguates the results and selects one or more right definitions.

Users can specify whether they want to update the rulebase with the results of processing a new document (1000). If an existing rule successfully matches an abbreviation/definition pair, then that rule's frequency is updated in the rulebase, thereby increasing the rule's priority. Users may also specify a rule threshold; rules applied with a frequency exceeding the threshold will be updated in or added to the rulebase.

Figure 3:
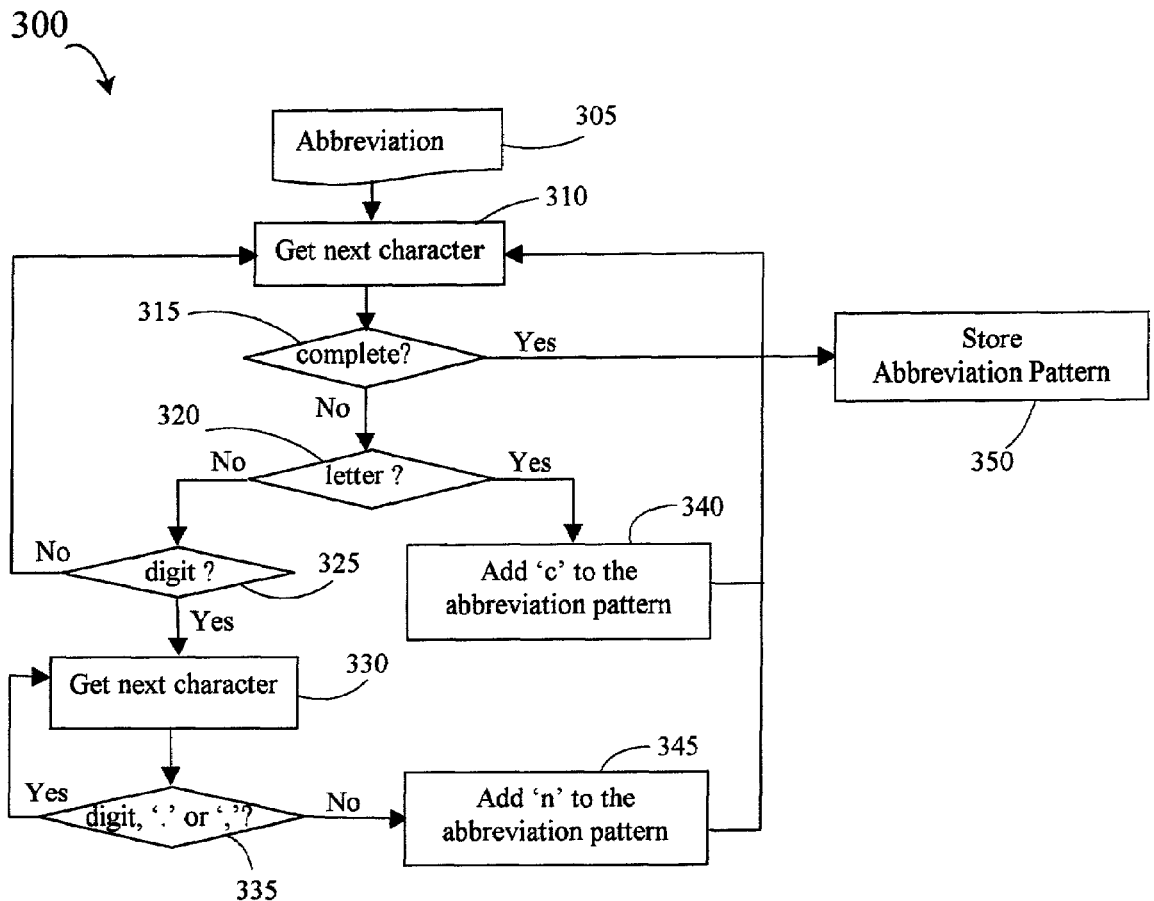
FIG. 3 is a flow chart of an abbreviation pattern generation.

FIG. 3 shows a flow chart of the abbreviation pattern generation process. When an abbreviation candidate is found (305) in a text, the system processes a character at a time (310) to generate a pattern representing the abbreviation. An abbreviation pattern is a string of "c" and "n" characters, which means "character" and "numeric string" respectively. The pattern string is empty at the beginning of this process. If a character in the abbreviation is an alphabetic character (320), the system adds a "c" in the pattern string (340). If a digit is found in the abbreviation (325), the system checks the next characters if they are also digits or "." or "," (330, 335), in an effort to identify a numeric string. The system recognizes a numeric string in the abbreviation and the system adds an "n" to the pattern string regardless of the length of the numeric string (345). Non-alphanumeric characters in the abbreviation, such as hyphen, slash, and ampersand, are not reflected in the abbreviation pattern. The system repeats this process until it scans all the characters in the abbreviation (315) and saves the abbreviation pattern (350).

Figure 4:
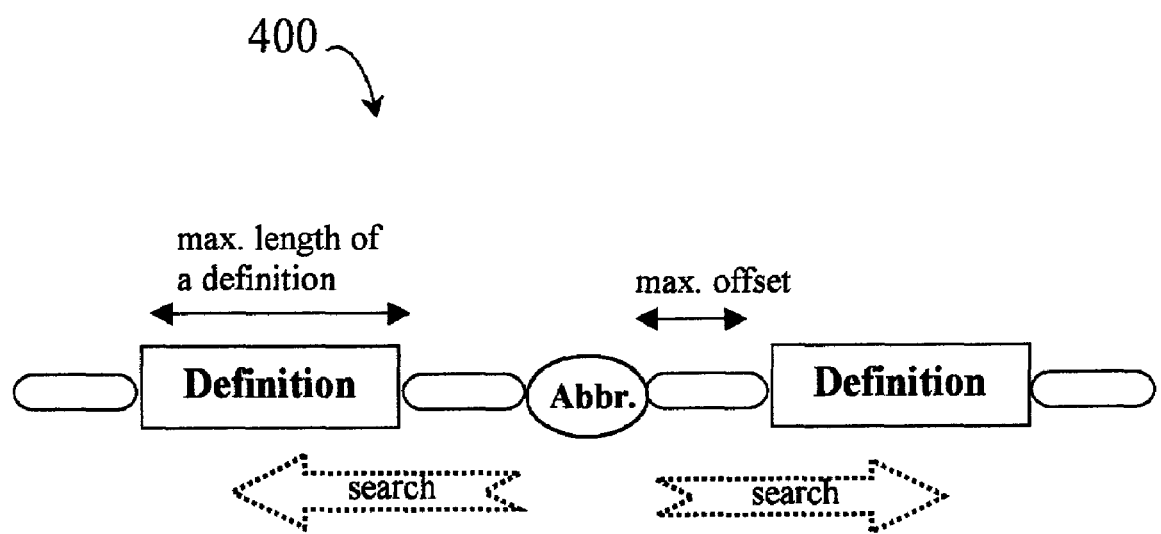
FIG. 4 is a block diagram of showing how candidate definitions are found.

FIG. 4 shows a block diagram for the definition finding process. The system searches for a possible definition of a candidate abbreviation in its left and right contexts. It calculates the size of the context based on the length of the abbreviation and the maximally allowed distance (offset) between a definition and its abbreviation.

The inventors have analyzed about 4,500 abbreviations and their definitions in computer science texts. The maximum number of skipped words (words in a definition that are not reflected in the abbreviation) was 4 in our sample data. Based on this analysis, we decided that, for relatively short abbreviations (from two to four characters), the length of a definition in words should not be greater than twice the abbreviation length. For long abbreviations (five or more characters), the definition should not be longer than the abbreviation length plus 5. Thus, the maximum length of a definition D of an abbreviation A is calculated as follows.

$$\max. |D| = \min\{|A|+5, |A|*2\}$$

The maximum offset means the longest distance of a definition from an abbreviation. If a definition is in the left context, the distance is the number of words from the last word of the definition to the abbreviation. If a definition is in the right context, the distance is the number of words from the abbreviation to the first word of the definition. We set the maximum offset to 10 in this experiment. Therefore, the size of each search space is {max. |D|+10} words to the left and right of the candidate abbreviation as shown in FIG. 4.

Figure 5:
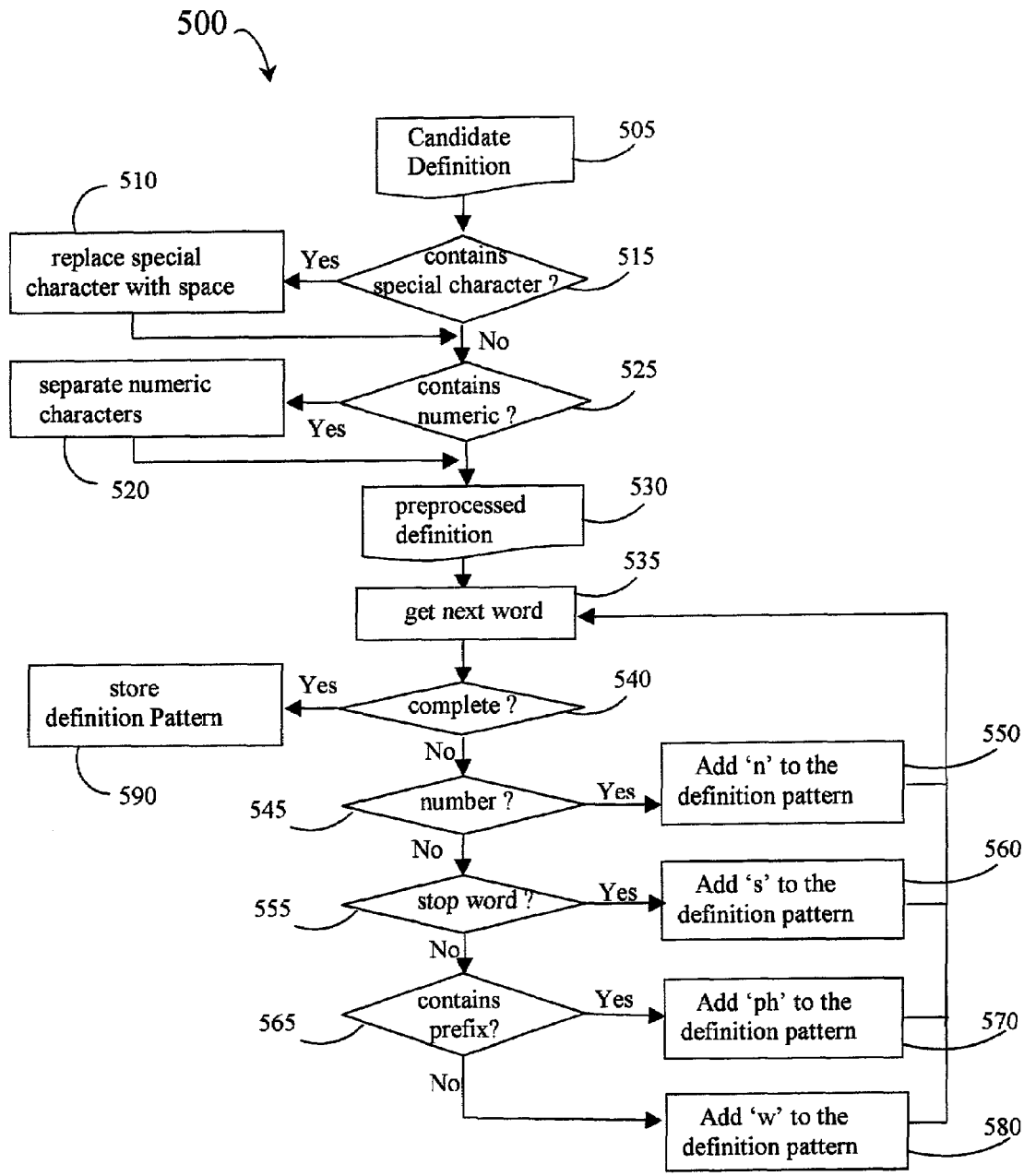
FIG. 5 is a flow chart of a definition pattern generation.

FIG. 5 shows a flow chart of the definition pattern generation process. The system examines a definition candidate (505) found by FIG. 4 (400) to produce a pattern string for the candidate. It first preprocesses the definition candidate and generates a preprocessed definition (530). The preprocess consists of two steps; if the candidate definition contains one or more special characters (515), the system replaces special symbols in the definition with spaces (510). If the definition candidate contains one or more numeral characters (525), the system separates numeric characters from the definition (520).

Having the preprocessed definition (530), the system generates a pattern by processing a string of characters (separated by a space) at a time (535) until it processes all the words in the definition (540). If a string is a numeric string as described in FIG. 3 (545), the system adds "n" to the definition pattern (550). If a string is a stopword (555), "s" is added to the definition pattern (560). If a string is a content word, the system checks if the word contains a prefix (565), which is an element of the prefix list this system has. If the word contains a prefix, the system breaks the word into the prefix and the headword and adds "ph"to the pattern (570). If the word does not contain a prefix, the system add "w" to the pattern (580). When all the strings in the preprocessed definition are read, the system stores the definition pattern for the next steps (590).

FIG. 6 shows examples of pattern-based abbreviation rules. An abbreviation rule describes how an abbreviation is formed from its definition. An abbreviation rule, R, consists of an abbreviation pattern (A_Pattern), a definition pattern (D_Pattern) and a formation rule (F_Rule).

$$R=<A\_Pattern, D\_Pattern, F\_Rule>$$

A formation rule defines how each character in an abbreviation is formed from a definition. An element in a formation rule has a pair of values, a word number and a formation method. A word number is the sequential location of a word within the preprocessed definition. A formation method represents how a character (or characters) in the word takes part in the abbreviation.

We have defined five kinds of formation methods: "F", "I", "L", "E" and "R". "F" means that the first character of a word occurs in the abbreviation. Similarly, "I" refers to an interior character and "L" indicates the last character of a word. "E" means "exact match" and "R" means "replacement match". Exact match ("E") is used only for matching numbers. If both a candidate abbreviation and a candidate definition contain a string of numeric characters, the two numbers must be exactly same. For example, "V3" is not an abbreviation of "Version 3.5" but may be an abbreviation of "Version 3". Replacement match ("R") is for recognizing multi-characters abbreviated with one character. In our current list of replacement matches, 'x' in an abbreviation may stand for "hex", "ex", "trans", or "cross"; 'f' may stand for "ph"; "1" may stand for "first", "one", or "1st"; and so on.

In one example, the abbreviation rule for the abbreviation "NEXT" and its definition "Near-End CrossTalk" is <cccc, www, (1, F) (2, F) (3, R) (3, I)>(14th rule in FIG. 6). The definition is encoded in "www" because "Near-End" is divided in two words "Near" and "End". This rule means that the first character in the abbreviation 'N' is formed from the first letter of the first word "(1, F)"; the second character "E" is from the first letter of the second word "(2, F)"; the third character "X" is formed by a replacement match within the third word ("Cross" is replaced into "X"); and "T" comes from an interior character of the third word.

Figure 7:
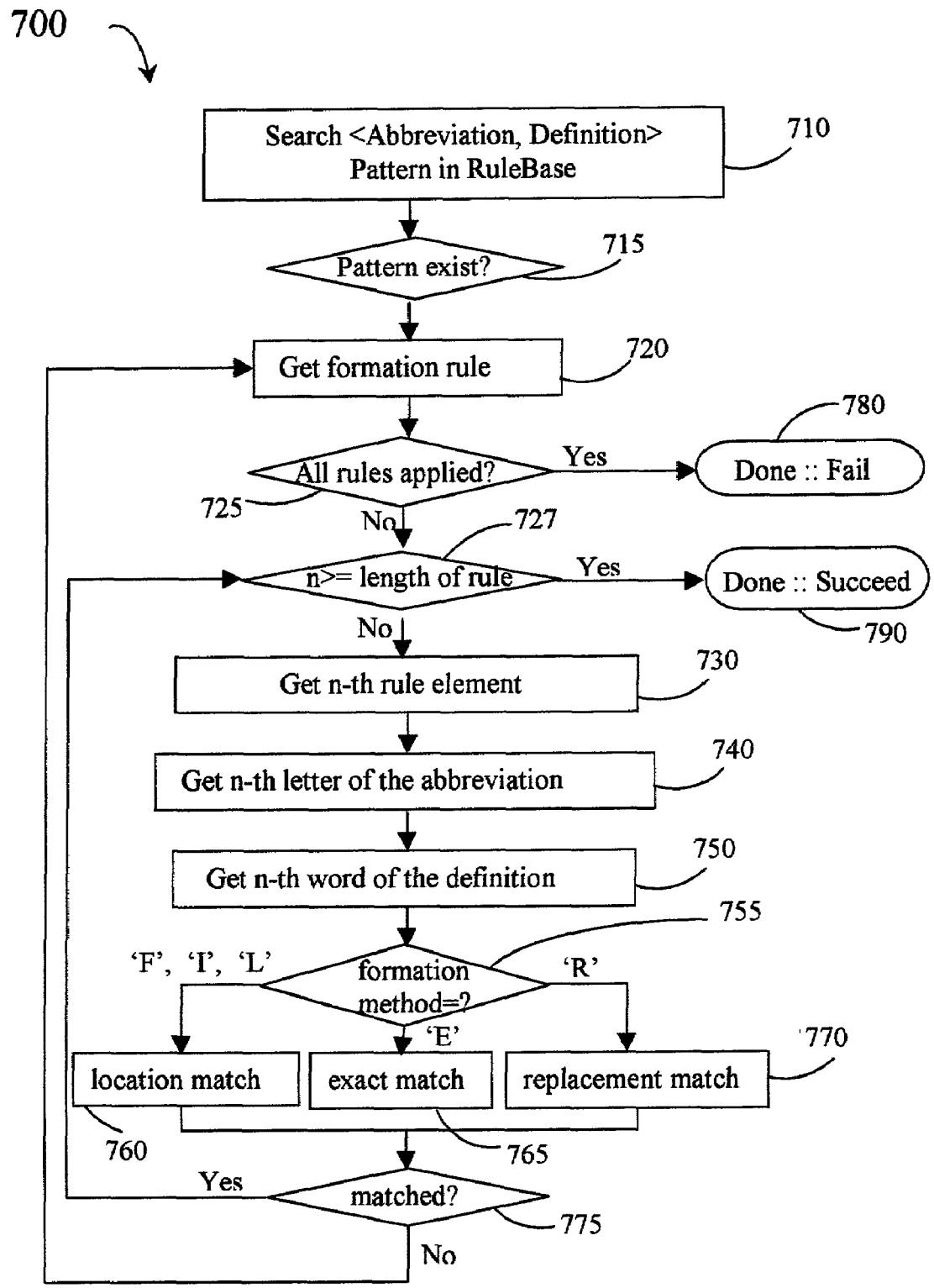
FIG. 7 is a flow chart of a rule base lookup and application process.

FIG. 7 shows a flow chart of the rule application process. When the system has found a candidate abbreviation with a candidate definition, it generates the A_pattern and the D_pattern respectively, and then looks up the pattern pair in the rulebase (710). If the pattern pair exists (715), the system retrieves one formation rule at a time in rule priority order (720), and applies the associated formation rules until a rule is successful to generate the given abbreviation from the definition (790) or all the rules for the pattern pair are tried (725, 780).

As shown in FIG. 6, a formation rule consists of one or more rule elements and the number of rule elements is the same as the length of the abbreviation pattern. The system applies one rule element at a time until it applies all the rule elements in a formation rule or until the match fails. The system retrieves the n-th (1<=n<=the number of rule elements) rule element from a formation rule (730), n-th character from the abbreviation pattern (740), and n-th string from the definition (750). Based on the formation method of the rule element (755), this system matches the character from the abbreviation and the string from the definition (760, 765, and 770). If this match is successful (775) and not all elements are matched (727), the process repeats. If the match is unsuccessful, the system retrieves the next rule (720) and tries to match the abbreviation and definition pair with the new formation rule.

Figure 8:
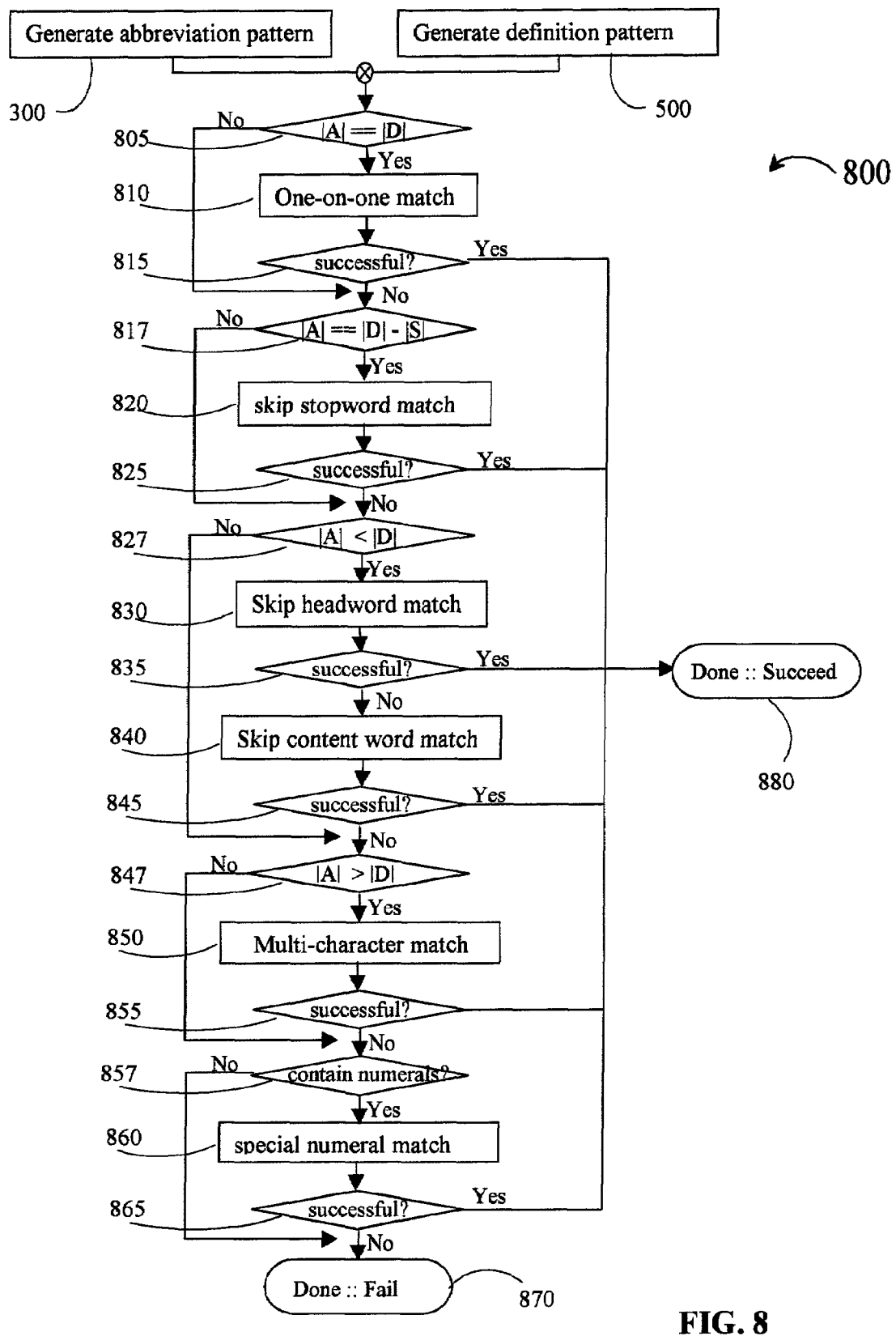
FIG. 8 is a flow chart of a rule generation process.

FIG. 8 shows a flow chart of the rule generation process. The system activates the rule generation process if the rulebase (140) does not have rules for the pattern pair or if the rule application process (FIG. 7) could not successfully generate the abbreviation from the definition, and if the pair occurs in one of the cue environments listed in the description for FIG. 2. This rule generation process was also used to create the initial rulebase (140) from a database of abbreviation-definition pairs.

The rule generation process consists of five layered matching algorithms. This invention categorizes abbreviations into five different types, one for each layer, based on the relationship between the abbreviation length and the length of the corresponding definition.

(1) Layer 1: $|A|=|D|$ (810)
  EDS, Electronic Data System
  MPH, miles per hour
  2MASS, Two Micron All Sky Servey
(2) Layer 2: $|A|=|D|-|S|$ (820)
  F&M, Facilities and Materials
  ASCA, Advanced Satellite for Cosmology and Astrophysics
(3) Layer 3: $|A|<|D|$ (830, 840)
  4GT, 4 Gigabyte memory Tuning
  FAME, Full Sky Astrometric Mapping Explorer
(4) Layer 4: $|A|>|D|$ (850)
  DB, DataBase
  CONTOUR, Comet Nuclear Tour
(5) Layer 5: special numerals (860)
  W3C, World Wide Web Consortium
  D2T2, Dye Diffusion Thermal Transfer $|A|$ represents the length of an abbreviation pattern. $|D|$ is the length of a definition pattern. $|S|$ indicates the number of stopwords in a definition. Abbreviations in layer 1 are the most frequent types of abbreviations in the database of about 4,500 abbreviations. Abbreviations in layer 2 are the next most frequent, and so on.

Having obtained an <A, D> pair, the system activates the abbreviation pattern generation process to produce a pattern for the given abbreviation (300). Likewise, the system calls the definition pattern generation process for generating a pattern for the given definition (500). Then, the system matches the <A, D> pair by applying the algorithms in layer order, beginning at layer 1. As we described in FIG. 6 (600) and FIG. 7 (700), this invention has five types of matching methods—"F", "I", "L", "E" and "R" and each layer applies them to match the abbreviation and the definition. If the pair is matched at any layer, matching stops and the successful formation rule is returned (880). If a match is not found at any layer, the candidate pair is discarded (870).

If the length of the abbreviation pattern is equal to the length of the definition pattern (805), the system first tries to match the pair by applying a one-on-one match routine (810). The one-on-one match routine matches the i-th letter in the abbreviation and the i-th word in the definition, where 1<=i<=the length of the abbreviation (definition) pattern. During the matching process, it records how the i-th word of the definition is abbreviated to the i-th letter of the abbreviation and generates a formation rule from the record. If it succeeds (815), the matching process stops and the formation rule is returned (880). If it fails, the system checks whether the pair satisfies the condition for the second layer (817).

The skip-stopword match routine is tried if the length of the abbreviation is equal to the length of the definition minus the number of stopwords in the definition, that is, the number of content words in the definition is equal to the length of abbreviation pattern (817). The skip-stopword match routine works like the one-on-one match routine except that it ignores stopwords in the definition (820). If this routine is not successful in matching the given pair (825), the system tries the next layer.

If the length of the abbreviation pattern is less than the length of the definition pattern (827), the system first uses a skip-headword match algorithm (830). Since this system separates a prefix from the headword and generates two symbols ("ph") in the definition pattern, many abbreviation and definition pairs belong to this category. The skip-headword match routine tries to match the abbreviation with the prefixes and other content words in the definition but ignores the headwords. If this method fails (835), we assume one or more headwords are reflected in the abbreviation instead of one or more content words. The skip-content-word match routine matches the abbreviation and definition pair by skipping one or more content words as well as one or more headwords (840). If it is successful (845), it returns the formation rule and the matching stops.

If the length of the abbreviation pattern is greater than the length of definition pattern (847), multiple characters from one or more words in the definition are reflected in the abbreviation. The multi-character match routine allows more than one of these characters to appear in the abbreviation. It also allows one or more words to be missing from the abbreviation (850). If it is successful (855), it returns the formation rule and the matching stops.

If none of the match routines explained above is successful and the abbreviation contains one or more numeral characters (857), the system activates the special-numeral match routine (860). If a numeric character appears next to an alphabetic character in the abbreviation, this routine replaces the numeric character, n, with (n−1) left adjacent characters and tries to match the new abbreviation and the definition by applying the routines from layer1 to layer 4, as described above. For example, suppose we have an abbreviation "W3" and a definition "World Wide Web", the routine changes "W3" into "WWW" and matches "WWW" and "World Wide Web". This process repeats until the match is successful (865) or until no numeric character remains. For example, abbreviation "D2T2" is modified into "DDT2" and then into "DDTT" to match with "Dye Diffusion Thermal Transfer". If this routine is not successful, the candidate pair is discarded (870).

Figure 9:
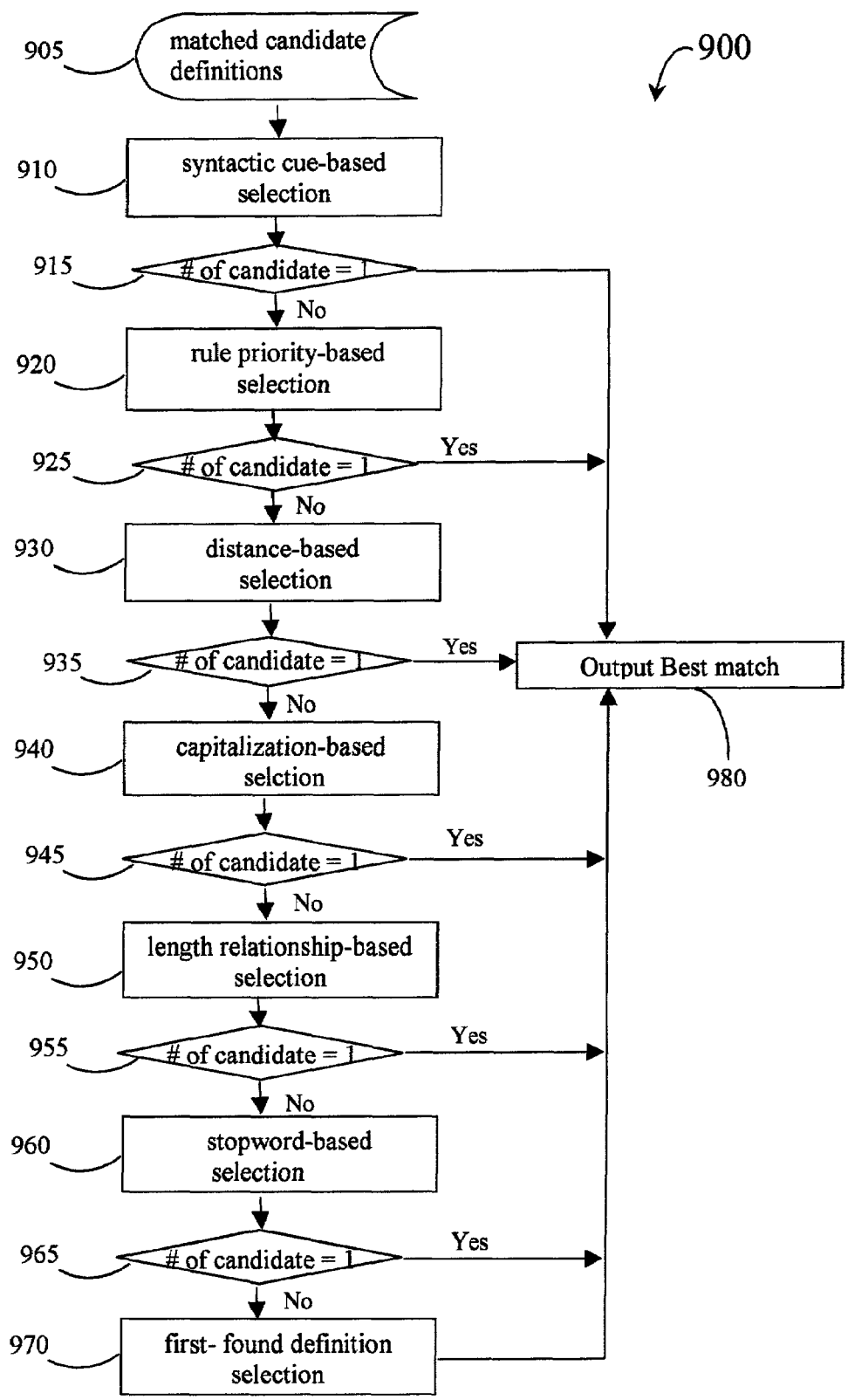
FIG. 9 is a flow chart of a best match selection process

FIG. 9 shows a flow chart of the best match selection process. The system may generate multiple definition candidates in many cases, but there exists only one definition in a local context. In order to select the best candidate, this invention employs several weighting features. If multiple candidate definitions are found in a document for an abbreviation, these six features are tested on the definitions in the order given, until one definition remains. If ambiguity still remains at the end of the test, the first definition is selected (970).

The system begins by obtaining the multiple candidate definitions which match the current candidate abbreviation (905). It then applies the following operations in sequence:

(1) Syntactic Cues (910)

Definitions are selected if they have one or more syntactic cues in context. If this test selects a single definition (915), then that definition is emitted as the best match (980).

(2) Rule Priority (920)

The definitions matched by highest priority rules are selected. If this test selects a single definition (925), then that definition is emitted as the best match.

(3) Distance (930)

The definitions closest to the abbreviation are favored over other candidate definitions. If this test selects a single definition (935), then that definition is emitted as the best match.

(4) Capitalization (940)

Definitions are selected if they are capitalized (upper-case first characters). If this test selects a single definition (945), then that definition is emitted as the best match.

(5) Number of Words (950)

Definitions are preferred based on the following sequence of length comparisons:

|A|=|D|, |A|<|D| and |A|>|D|

|A| means the length of an abbreviation and its value is the number of characters in the abbreviation pattern. Likewise, |D| means the length of a definition and its value is the number of characters in the definition pattern. If this test selects a single definition (955), then that definition is emitted as the best match.

(6) Number of Stopwords (960)

Definitions having fewer stopwords are preferred. If this test selects a single definition (965), then that definition is emitted as the best match.

If none of the above tests has produced a best match, then the definition found first (970) is emitted as the best match.

Figure 10:
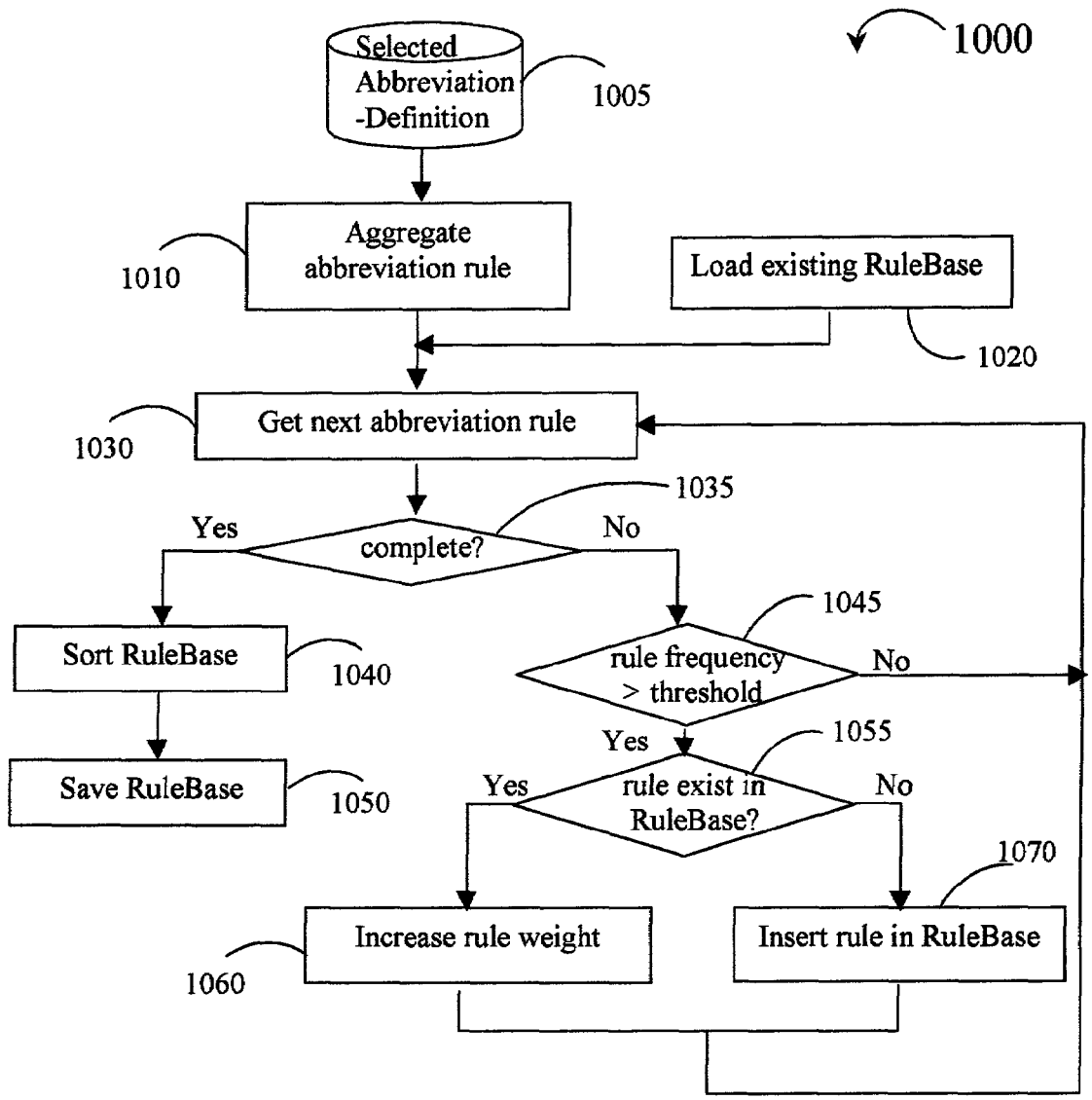
FIG. 10 is a flow chart of rule update process.

FIG. 10 shows a flow chart of the rulebase update process. Users can specify whether they want to update the rulebase with the results of processing a new document. Users may also specify a rule threshold; rules applied with a frequency exceeding the threshold will be updated in or added to the rulebase.

At the end of the processing of a document, the system aggregates all the abbreviation rules applied on the document—merging identical rules and counting the number of times a rule is used (1010). Once all documents have been processed, the rulebase update procedure begins by loading the existing rulebase into memory (1020). For each rule applied during document processing(1030), if the rule has applied more than the rule threshold specified (1045), the system updates the rulebase with this rule. If this rule exists in the rulebase, then that rule's frequency is updated in the rulebase, thereby increasing the rule's priority (1060). If this rule is a new rule (1055), then it is added to the rulebase (1070). When all rules have been processed (1035), the rulebase is sorted (1040) and saved (1050).

FIG. 11 shows some examples of the results produced by this invention. This invention matches not only acronyms but also various types of abbreviations such as 1-PP, mpc, W3C even though they don't occur with their definitions in cue environments.

We claim:

1. A system for matching one or more abbreviations and one or more definitions, comprising:

a recognition process that examines character strings and determines which character strings to be abbreviated;

an abbreviation pattern generation process that creates from said determined character strings one or more abbreviation patterns representing candidate abbreviations, each of the one or more abbreviation patterns being a template that indicates a number and a location of characters and numeric strings within a candidate abbreviation; and a definition pattern generation process that creates from said determined character strings one or more definition patterns representing candidate definitions, each of the one or more definition patterns being a template that indicates a number and a location of numeric strings, stopwords, prefix/headword combinations and base words within a candidate definition.

2. A system, as in claim 1, further comprising:

a set of abbreviation rules that correlate abbreviation patterns to definition patterns using one or more formation rules that define how each character in an abbreviation is formed from a definition, the set of abbreviation rules including abbreviation rules that have been automatically generated based on candidate abbreviations and definition patterns that have previously been determined as matches by the system;

a lookup process that selects one or more formation rules, being selected formation rules, corresponding to the abbreviation pattern of the candidate abbreviation and the definition pattern of the candidate definition; and a rule application process that applies the selected formation rules to determine which candidate definitions match the candidate abbreviation.

3. A system, as in claim 2, further comprising:
one or more matching algorithms that match one or more pairs of abbreviations and definitions based on the abbreviation patterns and the definition patterns.

4. A system, as in claim 3, where rule application process and the matching algorithm apply both rule based and non rule based matching processes to match one or more abbreviations and one or more definitions.

5. A system, as in claim 2, where the formation rule that produced the best candidate definition is weighted better due to the choice of the best candidate definition.

6. A system, as in claim 2, further comprising:
a process for adding new abbreviation rules in the existing set of abbreviation rules.

7. A system, as in claim 2, further comprising:
a mechanism for automatically generating one or more new abbreviation rules when no formation rules successfully match high-quality pairs of candidate abbreviations and definitions.

8. A system, as in claim 7, further comprising:
a process for automatically adding the created abbreviation rules to the existing set of abbreviation rules.

9. A system, as in claim 2, further comprising:
a rule generation process for generating abbreviation rules from pairs of abbreviations and definitions.

10. A system, as in claim 1, further comprising:
one or more matching algorithms that match one or more pairs of abbreviations and definitions based on the abbreviation patterns and the definition patterns.

11. A system, as in claim 1, further comprising:
a method for specifying pairs, each of which contains a candidate abbreviation and a candidate definition, for each pair generating an abbreviation patterns and a definition pattern.

12. A system, as in claim 11, where the pairs include one or more of the following:
a user input pair,
an existing abbreviation database pair, and
a pair produced by a program interface.

13. A system, as in claim 1, further comprising:
an abbreviation recognition process that finds one or more candidate abbreviations in text.

14. A system, as in claim 1, further comprising:
a definition finding process that locates one or more candidate definitions corresponding to the candidate abbreviation.

15. A system, as in claim 1, further comprising:
a best match selection process that chooses a best candidate definition from the matched candidate definitions using one or more criteria.

16. A system, as in claim 15, further comprising:
a best match selection mechanism that employs one or more weighting features.

17. A system, as in claim 16, where the weighting features may include one or more of the followings:
syntactic cues found in the context,
rule priority of the formation rule that matched the pair,
the distance of the abbreviation and the definition,
capitalization of the definition,
number of words in the definition, and
number of stopwords in the definition.

18. A system, as in claim 1, further comprising:
an output process that outputs the candidate abbreviation and the matched candidate definition as confirmed pairs.

19. A system, as in claim 1, further comprising:
a set of layered matching algorithms which are based on the relationship between the lengths of abbreviation patterns and the lengths of definition patterns.

20. A system, as in claim 19, where each algorithm in the layered matching mechanism is applied in priority sequence.

21. A system for matching one or more abbreviations and one or more definitions, comprising:
means for examining character strings and determining which character strings to be abbreviated;
means for generating from said determined character strings one or more abbreviation patterns representing candidate abbreviations, each of the one or more abbreviation patterns being a template that indicates a number and a location of characters and numeric strings within a candidate abbreviation; and
means for generating from said determined character strings one or more definition patterns representing candidate definitions, each of the one or more definition patterns being a template that indicates a number and a location of numeric strings, stopwords, prefix/headword combinations and base words within a candidate definition.

22. A method for matching one or more abbreviations and one or more definitions, comprising:
examining character strings and determining which character strings to be abbreviated;
generating from said determined character strings one or more abbreviation patterns representing candidate abbreviations, each of the one or more abbreviation patterns being a template that indicates a number and a location of characters and numeric strings within a candidate abbreviation; and
generating from said determined character strings one or more definition patterns representing candidate definitions, each of the one or more definition patterns being a template that indicates a number and a location of numeric strings, stopwords, prefix/headword combinations and base words within a candidate definition.

* * * * *